April 2, 1963   J. FRISINA   3,084,298
LOAD INDICATING DEVICE
Filed May 24, 1961   3 Sheets-Sheet 1
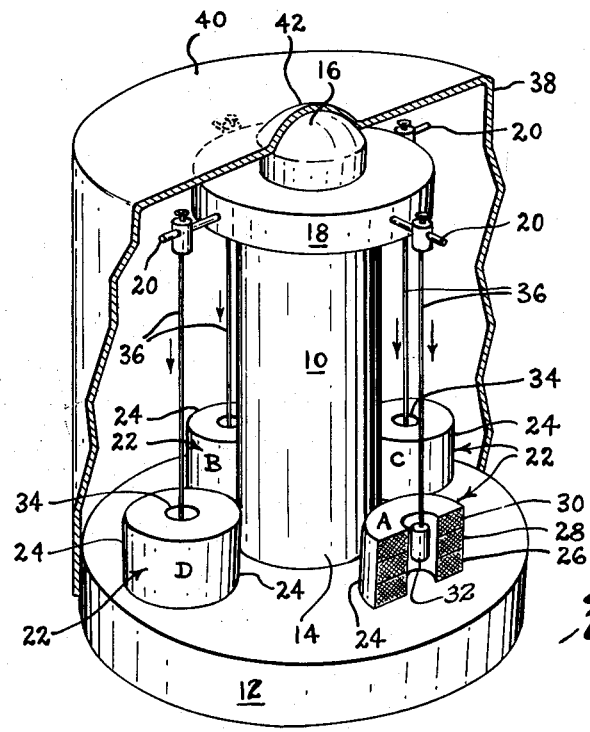
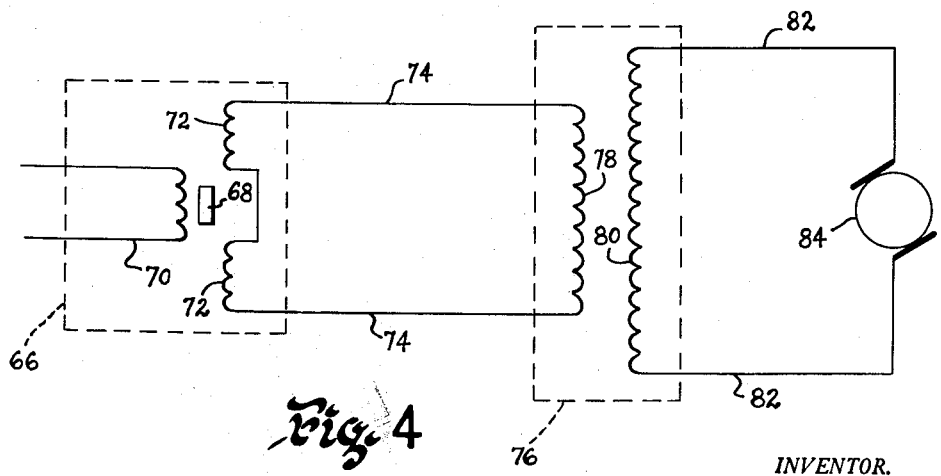
INVENTOR.
JOHN O. FRISINA
BY
Steward & Steward
HIS ATTORNEYS April 2, 1963  J. FRISINA  3,084,298
LOAD INDICATING DEVICE
Filed May 24, 1961  3 Sheets-Sheet 2

INVENTOR.
JOHN O. FRISINA
BY
Steward & Steward
his ATTORNEYS

United States Patent Office 3,084,298
Patented Apr. 2, 1963

3,084,298
LOAD INDICATING DEVICE
John Frisina, 20 Belrose Ave., Southington, Conn.
Filed May 24, 1961, Ser. No. 112,364
9 Claims. (Cl. 336—30)

The invention relates to load indicating devices in which the dimensional change produced in a physical object by the application of a force to the object is utilized to generate an electric signal that is proportional to the value of the applied force. The invention has a wide range of application and may be used to measure both static and dynamic forces such as weight, pressure, thrust or acceleration as well as others.

An application for which the invention is particularly well suited is the accurate weighing of very heavy loads, such as loads of the order of 25,000 pounds or more. Such loads are frequently encountered in industry. The weighing of loaded railroad cars would be but one specific example. The invention, therefore, will be described hereinafter with respect to this specific application. It will be understood, however, that the invention may be used to measure lighter loads if desired and in other load or force-measuring applications just as well.

One form of weighing apparatus that has come into wide use in recent years utilizes resistance strain gages. In this type of apparatus, gages of fine resistance wire are bonded to one or more steel columns and the load to be measured is applied to one end of the columns. The load results in a very slight deformation of the columns, usually on the order of a few thousandths of an inch. Because of the bonding between the columns and the wire strain gages a corresponding deformation occurs in the wires forming the gages. Since the resistance of the wire making up the gages changes under stress, the resistance of the gages varies in proportion to the deformation and, hence, to the load. This change in resistance is measured electrically as a change in voltage and calibrated into units of weight.

While this type of apparatus has received wide acceptance, it has not proven completely satisfactory in all respects. Certain inherent characteristics of the apparatus have had to be overcome before a reliable weighing device could be obtained. The necessity for compensating for these inherent characteristics has results in a much greater complication of the apparatus than would otherwise be necessary if these basic characteristics of the apparatus could be improved upon. As a consequence, existing apparatus of this type is difficult and expensive to manufacture, time consuming to install and readily subject to a loss of accuracy.

Most of the difficulties arise from the fact that while the physical and electrical components of the prior art apparatus are balanced in theory, they are not completely balanced in practice. Usual practice is to employ in each weighing cell two or more "active" columns to which the load is applied as well as one or more so-called "dummy" columns that are slightly shorter than the "active" columns so as not to be placed under the stress of the load. The strain gages on the "active" and "dummy" columns are then connected so as to form an equal arm Wheatstone bridge circuit.

However, modification of the Wheatstone bridge circuit is necessary to compensate for certain inherent characteristics. A principal characteristic is that the change in resistance in the strain gages, and hence the output voltage of the weighing cell, does not vary truly linearly with respect to the applied load. It is general practice, therefore to connect a shunt resistor across the output of each cell. Addition of this resistance to the circuitry of the cell destroys its physical balance and subsequent temperature changes in the cell will result in unequal resistance changes in the circuit. This has made it necessary in the past to incorporate temperature compensating external circuits in the apparatus thereby increasing its cost of manufacture.

A similar problem arises from the difficulty of making all components of the cell physically uniform. For instance, the "dummy" columns of necessity must be shorter than the "active" columns. Although this difference is very small, it is still significant. The different expansion and contraction occurring in the "dummy" and "active" columns during temperature changes in the cell introduces still another error which must be compensated for through additional external circuitry.

Manufacture of the cells is, in itself, difficult. Each of the "active" columns must be as nearly identical with each of the other columns as is possible. This means that the machining and grinding of these columns must be held to extremely close tolerances. At the same time the manufacture and application of the strain gages to the columns is highly critical. Each strain gage must be made from the same spool of wire and future replacements for the gages must also be set aside from the same spool. The bonding of the wire gages to the columns is also critical as the gages must be in the same relative locations on the columns, must have the same attitude and must have the same thickness of bonding material between the wire and the columns. Satisfying these requirements greatly complicates the manufacture of the weighing cells.

The foregoing discussion is illustrative of a few of the problems present in the manufacture of prior known devices of the resistance strain gage type. Although such devices have been widely accepted for weighing loads of 25,000 pounds and more, the cost of manufacturing accurate devices is high and maintenance of the requisite accuracy is difficult.

Accordingly, the present invention has for its general object the provision of apparatus for electrically measuring static and dynamic forces that will not be subject to as many difficulties as are encountered in presently known devices of the resistance strain gage type. More particularly, the invention has for an object the provision of an electric force measuring apparatus in which such inherent characteristics as output response to load, temperature reaction, freedom from side loading effects, as well as other characteristics, will be improved over those of prior known apparatus.

Still more specifically, the present invention has for an object the provision of an electric load measuring apparatus that will, in comparison with presently known electric load measuring devices, be relatively simple, highly accurate, easily maintained, small in size and low in cost.

The invention resides primarily in the development of a novel force or load indicating structure and in the combination of this structure with its associated circuitry. Briefly, and in general, the invention comprises one or more load-receiving columns of elastic material in combination with at least one differential transformer, the core of which is secured to the column so as to move in the same direction as, and in proportion to, the deformation of the column due to the load. Movement of the core relative to the primary and secondary windings of the transformer generates in the secondary windings a voltage that is proportional to the deformation of the column. Because of the elastic nature of the column, the deformation of the column will be proportional to the load.

Although more than one load-receiving column may be employed as desired, it is preferred that only one be used as one is sufficient for most purposes and the addition of other columns complicates the manufacture of the device and increases its cost. It is only necessary that there be one differential transformer present to act as a transducer in converting the physical deformation of the column into an electric signal, but it is preferred to utilize at least two transformers. In the most preferred form of the invention four such transformers are used.

The column, or columns as the case may be, is arranged so that one end is fixed against movement in a base member while the opposite end is free. The load to be measured is applied to the free end of the column so as to be directed substantially axially with respect to the column. In most instances the column will be mounted vertically but this is not a necessity as the column may be mounted in any desired attitude.

One or more transformers are positioned adjacent the column and are arranged with their cores so fixed to the column that deformation of the column results in a displacement of the cores relative to the windings of the transformers in a direction either coincident with or parallel to the axis of the column and one that is proportional to the deformation of the column. In one presently preferred form of the invention four transformers are equally spaced around a single column and the cores for the transformers are secured to the column adjacent its free end. Axial deformation of the column thereby results in displacement of all the cores in the same axial direction. Any non-axial load on the column will be reflected in opposite displacements of at least two of the cores.

The output voltages of the transformers are connected in an equal arm Wheatstone bridge type of circuit. In the case of four transformers two pairs of transformers are connected in parallel while each pair is connected in series opposition. Where only two transformers are used, these are connected in parallel. The output from the circuit represents a signal that is proportional to the load and may be utilized to activate any desired "read out" device such as a visual gage, an automatic printer, automatic accounting machines, or other similar devices.

For the purpose of illustrating the invention and the manner in which it may be made and used certain presently preferred embodiments are shown in the accompanying drawings and will be described in detail hereinafter. However, it is to be understood that the general and detailed descriptions set forth herein and the accompanying drawings are by way of example only and do not serve to define or restrict the scope of the invention, the claims appended hereto being relied upon for that purpose.

Of the drawings:

FIG. 1 is a perspective view, partly in section, of a preferred form of the invention showing the arrangement of the transformers with respect to the elastic column;

FIG. 4 is a wiring diagram of a modified form of the invention wherein only one transformer is utilized.

Figure 2:
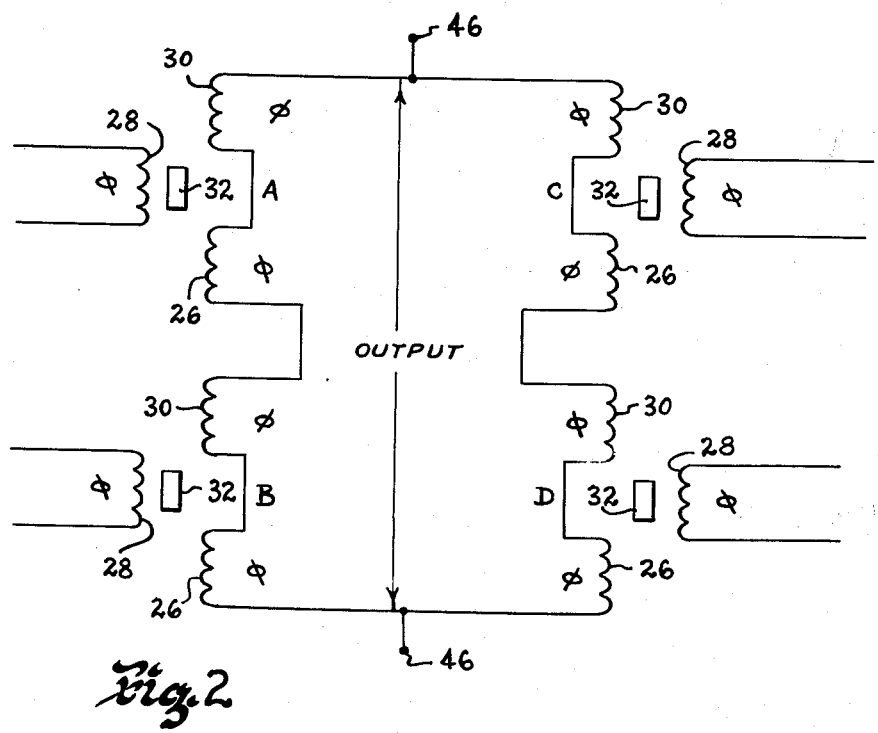
FIG. 2 is an electrical diagram showing how the transformers are connected to give an output voltage that is proportional to the load on the column.

As was stated above, the invention will be illustrated by describing its application to an electric weighing apparatus. It is customary, in such apparatus, to employ a weighing cell at the point of load and such a cell, constructed in accordance with the teachings of the present invention, is shown in FIG. 1.

In the preferred form of the invention shown in the drawings a single load-receiving column 10 is fixed at one end to a base 12. The column 10 is made from an elastic material, such as steel, so that the deformation of the column will be proportional to the load. One such column is preferred although additional columns may be employed as desired. The base 12 is generally circular, although it need not be, and has a relatively large diameter in comparison with the diameter of the column 10. Column 10 may be fixed to the base 12 by any suitable means as, for example, by means of a retaining screw (not shown) passing upwardly through the base into a tapped hole (also not shown) in the bottom of the column. In this manner one end 14 of the column is fixed against movement.

The opposite end 16 of the column 10 is free and it is to this end of the column that the load is applied. In order to assure substantially true axial loading on the column 10 the opposite, or upper, end 16 of the column is formed so as to be semi-spherical in shape. By reason of the semi-spherical shape of the upper end of the column any side loading of the column will tend to be directed axially.

Mounted on the column 10 adjacent the upper end 16 is a collar 18. The collar 18 is fixedly positioned on the column 10 by suitable fastening means such as set screws (not shown) so as to be movable therewith. Deformation of the upper end 16 of the column 10, accordingly, results in a proportional movement of the collar 18 in the same direction. Collar 18 carries a number of laterally extending arms 20, 20 that are equally spaced about the periphery of the collar. The number of arms is determined by the number of differential transformers employed in the cell, there being one arm for each transformer. One or more transformers may be used as desired. In the form of the invention shown four transformers 22, 22 are utilized, hence, the collar 18 is provided with four arms 20, 20.

The transformers 22, 22 comprise annular coils of wire 24, 24. Both the primary and secondary windings of the transformers are wound into the coils in any well known manner. In the transformers shown, the coils 24, 24 are wound in horizontal layers, the lowermost layer 26 being one portion of the secondary winding, the middle layer 28 being the primary winding, and the uppermost layer 30 being another portion of the secondary winding.

Cores 32, 32 for the transformers 22, 22 are disposed within the central openings 34, 34 in the coils 24, 24. Each core 32 has a threaded internal axial opening (not shown) by means of which the core is adjustably mounted on the lower end of a vertical arm 36 depending from one of the lateral arms 20, 20 in the collar 18. The vertical arms 36, 36 are made of non-magnetic material so that the magnetic flux pattern of the transformers will not be disturbed.

An outer casing 38 is provided for the cell. Casing 38 is generally cylindrical and encloses the base 12, column 10 and the transformers 22, 22. If desired the casing 38 may be hermetically sealed. The upper portion 40 of the casing 38 has an upwardly extending semi-spherical portion 42 that fits closely over the semi-spherical end 16 of the column 10. However, the thickness of the casing 38 is relatively thin and the casing, in addition to serving as a protective covering for the cell, simply serves as a thin diaphragm through which the load is transmitted to the column without, in any way, influencing the load.

The load to be weighed is applied to the outer casing 38 and, particularly, to the semi-spherical portion 42. The load is transmitted to the upper end 16 of the column 10 and by reason of the semi-spherical shape of the upper end substantially all of the load is directed axially of the column. As a consequence of the load, a slight compression of the column 10 occurs producing a very slight reduction in the height of the column. A corresponding downward movement of the collar 18 takes place and this downward movement of the collar 18 moves the cores 32, 32 downwardly relative to the coils 24, 24. Movement of the transformer cores 32, 32 changes the pattern of magnetic flux in the transformers and varies the output voltages of the transformers. These output voltages may then be used to indicate the extent of the movement of the cores and, hence, the amount of the load on the column, as will be described hereinafter.

It will be readily appreciated that while the preferred form of the invention employs the collar 18 as a means to secure the arms 20, 20 to the column 10 it is not essential. The arms 20, 20 could be directly secured to the column just as well.

The electrical circuit for the weighing cell shown in FIG. 1 is shown in the circuit diagram of FIG. 2. In the diagram reference numerals 28 represent the primary windings of the transformers 22, 22. The windings 28, 28 are each connected to a common source of alternating current. It is an important advantage of the present invention that relatively high voltage sources of alternating current, such as those used in residences and offices may be employed as the input voltage for the primary windings. The input voltage is stepped down to the desired output value in the secondary windings which are indicated by the reference numerals 26, 30. It is preferred that the output voltage of the secondary windings 26, 30 be about 5 volts but this is not essential and may be varied as desired. In prior art devices of the type described heretofore the output voltage of the strain gages is on the order of 1.75 millivolts per volt of input.

The two secondary windings 26, 30 of each transformer are oppositely wound so that the voltages generated therein will be opposite in phase and the windings are connected in series opposition. As a result of this arrangement the voltages generated in these windings oppose each other. If the voltage generated in each secondary winding of the transformer is the same then there will be no voltage output for the transformer as the two voltages will be equal and opposite and will cancel each other.

The position of the core 32 in the transformer determines the value of the voltages generated in the secondary windings 26, 30. When the core 32 is spaced so as to generate equal canceling voltages in the windings it is at the null point of the core. Movement of the core in either direction from the null point will result in a greater voltage being generated in one of the secondary windings than in the other. The winding toward which the core moves will have the greater voltage and, since the voltages of the two windings are not equal, there will be an output voltage for the transformer. An important advantage of the present invention over prior known apparatus is that the output voltage of the transformer varies linearly with respect to core movements as long as the core remains entirely within the coils of the transformer. A plot of output voltage against core displacement thus yields a straight line. Because of the true linearity of the output voltage of the transformers no compensating resistances or circuits are required.

Each transformer 22 is connected in series opposition with the transformer disposed diametrically opposite it on the opposite side of the column 10 in the weighing cell. Transformer A is thus connected in series opposition with transformer B and transformer C is connected in series opposition with transformer D. This physical arrangement of each pair of transformers, in conjunction with the connection of the secondary windings in series opposition, serves to eliminate the effects of any side loading that may be present in the column 10. Any side loading of the column 10 will tend to tilt the column. Tilting of the column 10 will, by reason of the physical arrangement of the transformers, tend to depress the transformer cores 32 on one side of the column and tend to raise the cores 32 on the opposite side of the column. This opposite movement of the cores will generate equal and opposite voltages in the secondary windings of the transformers that will cancel each other without affecting the output voltage generated by the total downward movement of all of the cores.

Figure 3:
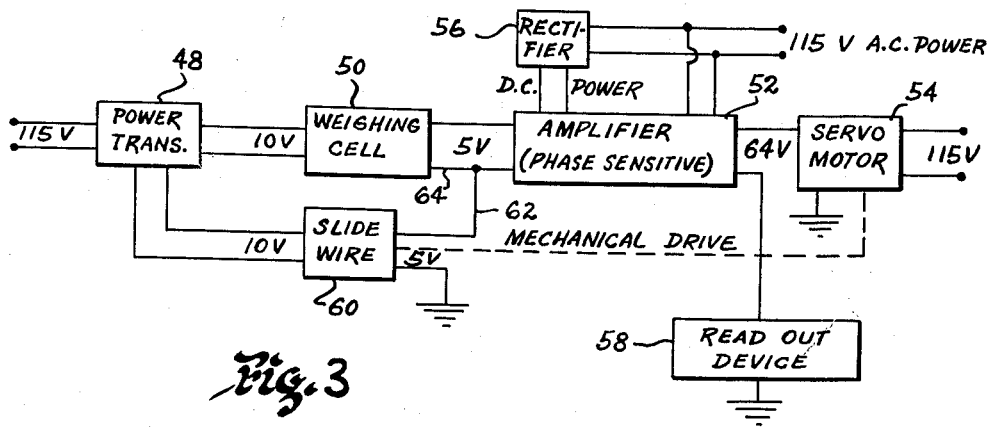
FIG. 3 is a block electrical diagram showing the wiring for an electric weighing apparatus.

Each pair of transformers are connected in parallel with the other pair of transformers so as to form a Wheatstone bridge type of circuit. The output voltage of the circuit measured across the terminals 46, 46 is proportional to the load on the weighing cell. Accordingly, the output voltage of the weighing cell is an electric signal that may be translated into a recognizable weight indication. The circuit diagram of apparatus for doing this is shown in FIG. 3.

Power from a 115 volt, alternating current source is put into a transformer 48 where it is stepped down to an output voltage of 10 volts. This is not essential as the 115 volt power source could be used directly. However, in order to reduce the size of the wires of the apparatus, it is preferred to reduce the voltage.

The output voltage of the transformer 48 is then used to energize the primary windings of the differential transformers in the weighing cell 50. Each of the transformers in the cell is another step down transformer and the output voltage of the weighing cell 50 is stepped down to 5 volts or less depending on the extent of the deformation of the column.

Output of the cell 50 is utilized as the input to a phase sensitive amplifier 52 that serves to drive a phase responsive servomotor 54. The amplifier 52 is provided with a supply of 115 volt alternating current power and a rectifier 56 serves to supply direct current power to the amplifier. Power for the primary winding of the servomotor 54 is supplied by the amplifier 52 while power for the secondary winding of the motor 54 is supplied from a 115 volt source of alternating current.

As long as there is no input to the amplifier the amplifier feeds a rectified alternating current to the primary winding of the servomotor. The voltage of this current is equal in value and phase in both halves of the cycle and does not have any rotational effect on the servomotor. When an input voltage signal is received from the weighing cell the signal modifies the voltage of the current in the primary winding of the servomotor by increasing the voltage in one half of the cycle and reducing the voltage in the other half of the cycle. The resultant shift in the value of the voltage in the primary rotates the servomotor in one direction. At the same time the modified voltage is put into a suitable read out device 58 such as a light bank, printer or other like device.

The motor 54 and the read out device 58 will be actuated as long as the input signal modifies the voltage of the amplifier output. However, in a weighing application a continuous signal is not desired. In such an application it is preferred that the load indicating signal be counterbalanced by an equalizing signal so as to bring the system into equilibrium while the load is still on the scale. This type of arrangement provides a continuous weight indication until the weight is removed from the weighing cell just as in the case of a mechanical scale.

A counterbalancing input voltage to the amplifier 52 is obtained from a slide wire potentiometer 60. Like the weighing cell 50 the potentiometer 60 is connected to the output side of the power transformer 48 and has the same input voltage as the weighing cell. By proper selection of the pick off point on the slide wire the output voltage of the potentiometer 60 may be made equal to the output voltage of the weighing cell 50. At the same time the output voltage of the potentiometer 60 is selected so as to have a phase relationship opposite to that of the output voltage of the weighing cell. The potentiometer's output is connected to the amplifier input by means of the connector 62 which is joined to one of the connectors 64, 64 between the cell 50 and the amplifier 52. In this way the output voltage of the potentiometer is placed in bucking opposition to that of the cell.

The voltage pick off selector (not shown) of the slide wire potentiometer 60 is mechanically connected to the armature of the servomotor 54 through a suitable gear mechanism (also not shown). Accordingly, when the servomotor 54 is actuated in response to an output signal from the weighing cell 50 the slide wire pick off selector is advanced so that the potentiometer 60 sends a voltage signal to the amplifier. Since this signal has a phase opposite that of the weighing cell it cancels an equal portion of the cell output. However, the servomotor is a phase sensitive motor and so as long as there remains any uncanceled portion of the cell output signal the motor continues to advance the pick off selector of the potentiometer. Only when the output of the potentiometer 60 equals and completely cancels that of the weighing cell 50 does the motor stop. The system is then in equilibrium and the read out device 58 will indicate the weight on the cell 50.

As long as the weight remains on the weighing cell 50 the equilibrium of the system will be maintained. If the weight is removed the weighing cell 50 no longer has an output voltage and the only input to the amplifier 52 is the output voltage of the potentiometer 60. Since this voltage is opposite in phase from the cell output the voltage impressed on the primary winding of the servomotor is reversed. The servomotor, accordingly, reverses its rotation and the slide wire pick off selector is returned to its no output position. As soon as the output of the potentiometer becomes zero the motor stops and the read out device 58 indicates a no load condition. The system is then ready for the next weighing operation.

The circuit diagram of a simpler embodiment of the invention is shown in FIG. 4. In this embodiment only one differential transformer (indicated schematically by the dotted lines 66) is employed. As in the previously described embodiment the core 68 of the transformer is fixed to a column (not shown) so as to move proportionally to the deformation of the column under load. Displacement of the core 68 with respect to the primary and secondary windings 70 and 72, respectively, of the transformer 66 generates a voltage across the conductors 74, 74. This voltage output is then stepped up to a desired operating voltage in the transformer 76, the output of the differential transformer 68 being fed to the primary winding 78. The secondary winding 80 of the transformer 76 has many more turns than the primary 78 so a much larger voltage is induced in the secondary. The voltage so induced may then be fed through conductors 82, 82 to a servomotor 84 or to some suitable read out device.

Figure 5:
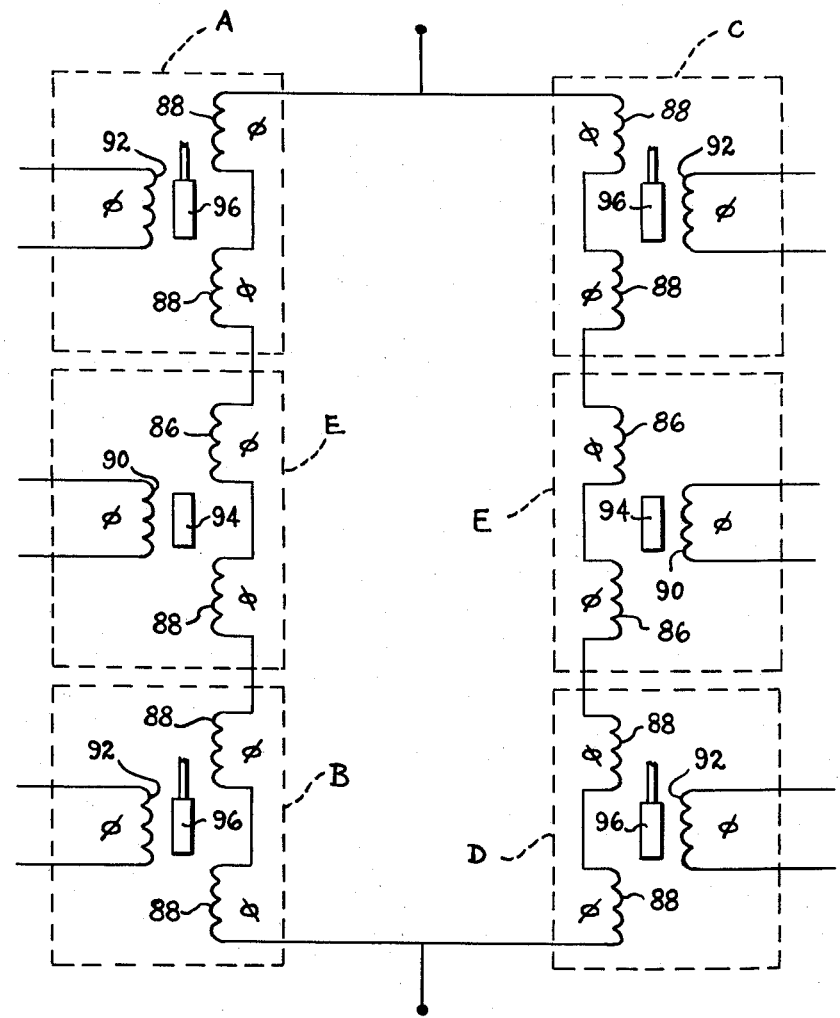
FIG. 5 is a wiring diagram of a modified form of the invention adapted to provide a load indication in either of two opposite directions.

While the invention has been described above in connection with the measurement of a unidirectional force it may also be used to measure oppositely acting forces. The circuit diagram for such an embodiment is shown in FIG. 5. In general the apparatus is similar to that shown in FIGS. 1 and 2 except that the column 10 is adapted to sustain a load in tension as well as in compression and two so-called "dummy" transformers are added to serve as reference points for the system. As is seen by reference to FIG. 5, the secondary windings 86, 86 of each of the dummy transformers E, E are connected in series with each other and with the secondary windings 88, 88 of the paired transformers AB and CD. The primary windings 90, 90 of the reference transformers E, E are connected to the same power source as the primary windings 92, 92 of the transformers A, B, C and D. However, the cores 94, 94 of the transformers E, E are not joined to the column of the cell as are the cores 96, 96 of the active transformers A, B, C and D. Cores 94, 94 are positioned at the null point of the transformers E, E and are wound so that movement of the cores 94, 94 in the same direction as the cores 96, 96 produces an output voltage opposite in phase to that produced by the movement of the cores 96, 96. Ordinarily the transformers E, E do not produce an output voltage since the cores 94, 94 are at the null point. The transformers A, B, C and D function in the same manner described previously.

In the event that the cell is subjected to an outside influence, such as a temperature change, that affects the output of the transformers the dummy or reference transformers E, E will be affected to the same degree as transformers A, B, C and D. The dummy transformers will then produce an output voltage equal and opposite to the output voltage generated in the transformers A, B, C and D because of the biasing effect of the temperature on the system. In this way the system is always maintained in alignment with the reference point and movement of the cores 96, 96 in either direction produces an output voltage that is truly proportional to the load.

What is claimed is:

1. In a load indicating device, means for generating a signal proportional to the load, said means comprising, a column of elastic material fixed against movement at one end and free for movement at the other end upon the application of a force to said free end, and at least one differential transformer adjacent said column, said transformer having a coil member of primary and secondary windings and a core member axially positioned within said windings parallel to the axis of the column, one of said members being joined to the column so as to move relative to the other of said members in the same direction as said free end in response to the force applied thereto, the displacement of the member relative to the said other member serving to generate in said secondary windings upon the energization of the primary windings an output voltage proportional to the displacement of the movable member.

2. Signal generating means as set forth in claim 1 having at least two differential transformers oppositely disposed to each other adjacent the column so that non-axial loads on said column will move the movable members of said transformers in equal and opposite directions.

3. Signal generating means as set forth in claim 2 wherein the secondary windings of said differential transformers are connected in parallel.

4. In a load indicating device, means for generating a signal proportional to the load, said means comprising, a column of elastic material fixed against movement at one end and free for movement at the other end upon the application of a force to said free end, and four differential transformers equally spaced about said column so that each of said transformers is opposite another of said transformers, each of said transformers having a coil member of primary and secondary windings and a core member axially positioned within said windings parallel to the axis of said column, one of said members being joined to the column so as to move relative to the other of said members and in the same direction as said free end in response to the force applied thereto, the displacement of the member relative to the said other member serving to generate in the secondary windings of the transformers upon the energization of the primary windings an output voltage proportional to the displacement of the movable member.

5. Signal generating means as set forth in claim 4 wherein the secondary windings of each pair of opposed transformers are connected in series opposition with each other and in parallel with the secondary windings of said other pair of opposed transformers.

6. In a load indicating device, means for generating a signal proportional to the load, said means comprising, a vertically disposed column of elastic material fixed against movement at one end and free for movement at the other end upon the application of a force to said free end, four differential transformers equally spaced about and adjacent said column, each of said transformers having a coil of primary and secondary windings and a core axially positioned within said windings and disposed parallel to the axis of the column, and means fixed to said column adjacent the free end thereof and fixed to said cores for suspending said cores within said primary and secondary windings whereby deformation of the column results in displacement of said cores relative to said windings so as to generate in the secondary windings of the transformers upon the energization of the primary windings an output voltage proportional to the displacement of the cores.

7. Signal generating means as set forth in claim 6 wherein said cores are adjustably fixed to said means so that the relative position of the cores to the windings may be varied.

8. Signal generating means as set forth in claim 7 wherein said means comprise a plurality of arms laterally extending from said column adjacent the free end thereof and a plurality of vertically disposed arms depending from said laterally extending arms, there being a lateral arm and a vertical arm for each transformer core, said cores being adjustably secured to the depending vertical arms.

9. Signal generating means as set forth in claim 8 wherein the secondary windings of oppositely disposed transformers are connected in series opposition with each other and in parallel with the secondary windings of said other opposed differential transformers.

References Cited in the file of this patent
UNITED STATES PATENTS 2,921,279    Cosby et al. _____ Jan. 12, 1960
2,922,971    Jeglum _____ Jan. 26, 1960